(12) United States Patent
Udall et al.

(10) Patent No.: US 8,985,946 B2
(45) Date of Patent: Mar. 24, 2015

(54) MOUNTING SYSTEM

(75) Inventors: Kenneth F. Udall, Ilkeston (GB); Alexander V. Lavrenko, Derby (GB)

(73) Assignee: Rolls-Royce PLC, London (GB)

( * ) Notice: Subject to any disclaimer, the term of this patent is extended or adjusted under 35 U.S.C. 154(b) by 436 days.

(21) Appl. No.: 13/483,461

(22) Filed: May 30, 2012

(65) Prior Publication Data

US 2012/0321470 A1 Dec. 20, 2012

(30) Foreign Application Priority Data

Jun. 14, 2011 (GB) .................................. 1109227.7

(51) Int. Cl.
*F01D 7/00* (2006.01)
*F01D 21/00* (2006.01)
(Continued)

(52) U.S. Cl.
CPC .. *F01D 5/30* (2013.01); *F01D 7/00* (2013.01); *F02K 3/072* (2013.01); *B64C 11/306* (2013.01); *B64D 2027/005* (2013.01); *Y02T 50/66* (2013.01)
USPC ...... 416/2; 415/9; 415/68; 415/229; 416/129; 416/147; 416/168 A; 416/174; 416/204 A; 416/205; 416/207

(58) Field of Classification Search
USPC .............. 415/9, 68–69, 129–130, 229; 416/2, 416/93 R, 94, 124, 128, 129, 130, 147, 155, 416/159, 162–164, 168 R, 168 A, 174, 416/204 R, 204 A, 205, 207, 209
See application file for complete search history.

(56) References Cited

U.S. PATENT DOCUMENTS 4,171,183 A * 10/1979 Cornell et al. .................. 416/94
4,863,352 A * 9/1989 Hauser et al. ............. 416/204 R
(Continued)

FOREIGN PATENT DOCUMENTS

EP 0 822 137 A2 2/1998
GB 546621 12/1940
(Continued)

OTHER PUBLICATIONS

Search Report issued in British Application No. 1109227.7 dated Aug. 31, 2011.
(Continued)

*Primary Examiner* — Christopher Verdier
(74) *Attorney, Agent, or Firm* — Oliff PLC

(57) ABSTRACT

A mounting system for mounting a blade to a rotor body includes a pitch control mechanism including an anchor and a pitch change rod extending radially outwardly from the anchor to join to a base of the blade. The anchor and the rod are rotatable about the longitudinal axis of the rod to vary the blade pitch. The pitch control mechanism further includes a torque-transmitting formation between the blade and the anchor such that pitch-varying torque can be transmitted to the blade through the torque-transmitting formation while allowing relative radial movement between the blade and the anchor. The system includes a primary bearing formation, which transmits blade centrifugal loads to the rotor body while accommodating variation of the blade pitch, and secondary bearing formation, which transmits pitch change mechanism centrifugal loads to the rotor body while accommodating rotation of the anchor and the rod during variation of the blade pitch.

12 Claims, 5 Drawing Sheets

(51) Int. Cl.
*F01D 5/30* (2006.01)
*F02K 3/072* (2006.01)
*B64C 11/30* (2006.01)
*B64D 27/00* (2006.01)

(56) References Cited

U.S. PATENT DOCUMENTS 5,263,898 A * 11/1993 Elston et al. .................. 416/147
2010/0215499 A1    8/2010 Lafont 2010/0239421 A1    9/2010 Boston et al.

FOREIGN PATENT DOCUMENTS

GB            825303       3/1958
WO   WO 2010/116080 A1   10/2010

OTHER PUBLICATIONS

Oct. 1, 2014 European Search Report issued in European Patent Application No. EP 12 16 9971.

* cited by examiner

MOUNTING SYSTEM

The present invention relates to a mounting system for mounting a propeller blade to a rotor body.

Referring to FIG. 1, a twin-spooled, contra-rotating propeller gas turbine engine is generally indicated at 10 and has a principal and rotational axis 9. The engine 10 comprises a core engine 11 having, in axial flow series, an air intake 12, a low pressure compressor 14 (LPC), a high-pressure compressor 15 (HPC), combustion equipment 16, a high-pressure turbine 17 (HPT), low pressure turbine 18 (LPT), a free power turbine 19 (FPT) and a core exhaust nozzle 20. A nacelle 21 generally surrounds the core engine 11 and defines the intake 12 and nozzle 20 and a core exhaust duct 22. The engine 10 also comprises two contra-rotating propellers 23, 24 attached to and driven by the free power turbine 19, which comprises contra-rotating blade arrays 25, 26. In other arrangements, however, the free turbine may be a single rotation turbine driving counter-rotating propellers by an epicyclic gearbox.

The gas turbine engine 10 works in a conventional manner so that air entering the intake 12 is accelerated and compressed by the LPC 14 and directed into the HPC 15 where further compression takes place. The compressed air exhausted from the HPC 15 is directed into the combustion equipment 16 where it is mixed with fuel and the mixture combusted. The resultant hot combustion products then expand through, and thereby drive the high, low-pressure and free power turbines 17, 18, 19 before being exhausted through the nozzle 20 to provide some propulsive thrust. The high, low-pressure and free power turbines 17, 18, 19 respectively drive the high and low pressure compressors 15, 14 and the propellers 23, 24 by suitable interconnecting shafts. The propellers 23, 24 normally provide the majority of the propulsive thrust.

The propellers 23, 24 are critical components that can cause great damage to the aircraft or people or facilities in the ground if they become released.

Aero propellers, whether single rotor or contra-rotating, or whether in a pusher configuration as shown in FIG. 1 or a puller configuration, usually have a means of varying the blade pitch via a pitch control mechanism (PCM), to optimise efficiency of thrust delivery and to reduce noise throughout the flight envelope, to provide reverse thrust, and to be able to feather the blades to control drag and rotor speed in some powerplant failure cases. There are a number of established ways of configuring a PCM, but all feature a source of power, prime mover, mechanism from prime mover to blade, and a failsafe system. The power source can be in the static or rotating field, although it is more common for it to be in the static field to avoid static to rotating control communication issues and for easier line replacement of faulty components. However, where the power source is in the static field, a means of transferring the power to the rotating field(s) is required.

An aim of the present invention to provide a mounting system for mounting a propeller blade to a rotor body which has a back-up retention capability in order to provide increased protection against inadvertent blade release.

The present invention is at least partly based on a realisation that pitch control mechanisms can conveniently be adapted to provide such capability.

Accordingly a first aspect of the present invention provides a mounting system for mounting a blade to a rotor body, the system having:
a pitch control mechanism including an anchor and a pitch change rod extending radially outwardly from the anchor to join to a base of the blade, the anchor and the rod being rotatable about the longitudinal axis of the rod to vary the blade pitch, wherein the pitch control mechanism further includes a torque-transmitting formation between the blade and the anchor such that pitch-varying torque can be transmitted to the blade through the torque-transmitting formation while allowing relative radial movement between the blade and the anchor,
a primary bearing formation which transmits blade centrifugal loads to the rotor body while accommodating variation of the blade pitch, and
a secondary bearing formation which transmits pitch change mechanism centrifugal loads to the rotor body while accommodating rotation of the anchor and the rod during variation of the blade pitch;
wherein:
in normal operation, the radial spacing of the anchor and the blade is maintained by the primary and secondary bearing arrangements, and
the mounting system further has a back-up retention formation which, on failure of the primary bearing formation leading to outward radial movement of the blade relative to the anchor, activates to divert blade centrifugal loads through the secondary bearing formation to the rotor body.

Thus the pitch control mechanism, which has a primary function of varying the blade pitch, can also provide a back up load path for blade centrifugal loads on failure of the primary bearing formation. This is a significant safety advantage. Further, there is usually little weight penalty involved in adopting the back-up retention formation.

The mounting system may have any one or, to the extent that they are compatible, any combination of the following optional features.

Typically the blade is a propeller blade, but may be e.g. a fan blade.

The rotor body may have a radially outer hub and a radially inner hub, the primary bearing formation transmitting blade centrifugal loads to the rotor body at the outer hub, and the secondary bearing formation transmitting pitch change mechanism centrifugal loads to the rotor body at the inner hub. For example, the inner and outer hubs may be separated by an annulus which, in use, carries engine exhaust gases.

The torque-transmitting formation can be located between a radially outer end of the pitch change rod and the base of the blade. Another option, however, is for the torque-transmitting formation to be located between the radially inner end of the pitch change rod and the anchor.

Conveniently, the torque-transmitting formation can be provided by male and female coupling members. For example, the coupling members may have respective inter-engaging sets of splines to transmit the torque between the members.

Preferably, the blade is separable from the rotor body at the torque-transmitting formation.

The back-up retention formation can allow up to 5 mm, and preferably up to 3 or 2 mm, of outward radial movement of the blade relative to the anchor before engaging to divert blade centrifugal loads through the secondary bearing formation to the rotor body.

Conveniently, the back-up retention formation can be adjacent to the torque-transmitting formation.

The back-up retention formation may be provided by abutment surfaces, which in normal operation are spaced apart, but engage together on outward radial movement of the blade relative to the anchor to divert blade centrifugal loads across an interface formed between the abutment surfaces. The abutment surfaces can be provided by lugs, screw threads, pegs and hook slots etc.

The pitch control mechanism may further include a crank (such as bell crank) for rotating the anchor, the crank being operable by a unison ring.

A second aspect of the present invention provides a propeller or fan assembly having:
 a rotor body, and
 a row of propeller or fan blades;
  wherein each blade is fastened to the rotor body by a respective mounting system according to the first aspect.

A third aspect of the present invention provides an engine arrangement having:
 a power plant, and
 one or more propeller or fan assemblies according to the second aspect powered by the power plant.

For example, the power plant can be a gas turbine engine. The engine arrangement may have contra-rotating propeller assemblies, each according to the second aspect.

Embodiments of the invention will now be described by way of example with reference to the accompanying drawings in which.

Figure 2:
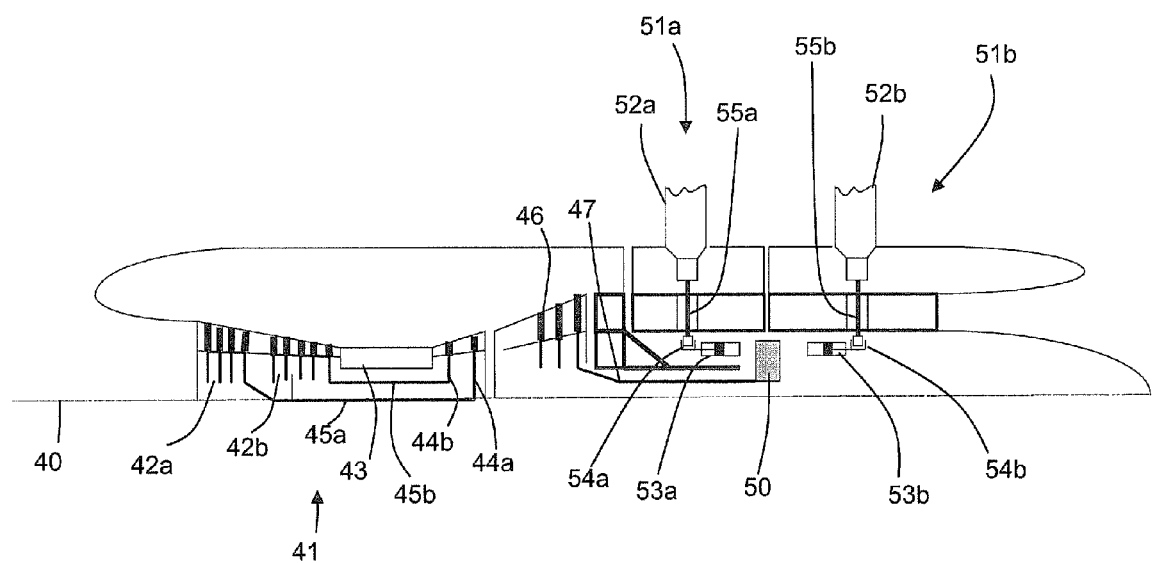
FIG. 2 shows schematically a longitudinal section through a further twin-spooled, contra-rotating propeller gas turbine engine.

A schematic longitudinal cross-section through a pusher style, contra-rotating propeller, turboprop engine having a centre line 40 is shown in FIG. 2. The engine has a generator section 41 comprising in flow series low pressure 42a and high pressure 42b compressor subsections, a combustor subsection 43, and high pressure 44b and low pressure 44a turbine subsections. Generator drive shafts 45a, 45b connect the respective compressor and turbine subsections. Downstream of the generator section is a free power turbine 46 which drives a rearwardly extending power drive shaft 47.

The distal end of the power drive shaft 47 drives an epicyclic gear assembly 50 which is coaxial with the power drive shaft. The gear assembly drives a first propeller assembly 51a on the upstream side of the assembly, and a contra-rotating second propeller assembly 51b on the downstream side of the assembly. Each propeller assembly has a row of propeller blades 52a, 52b, with each blade being rotatable about its longitudinal axis to vary the blade pitch. The pitch variation for each propeller assembly is achieved by a respective main hydraulic actuator 53a, 53b which moves a corresponding unison ring 54a, 54b in the axial direction of the engine. The axial movement of the unison rings rotates the blades via a pitch rod and bell crank arrangement 55a, 55b which extends from the base of each blade.

Figure 1:
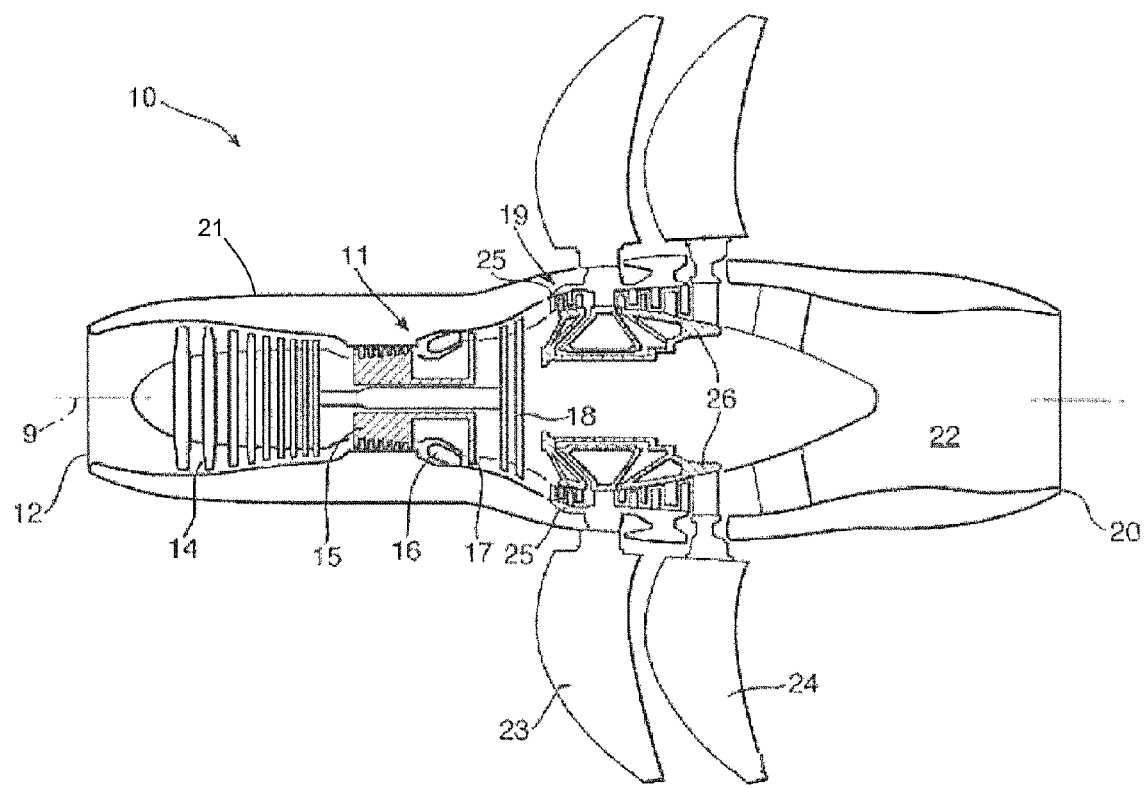
FIG. 1 shows schematically a longitudinal section through a twin-spooled, contra-rotating propeller gas turbine engine.
Figure 3:
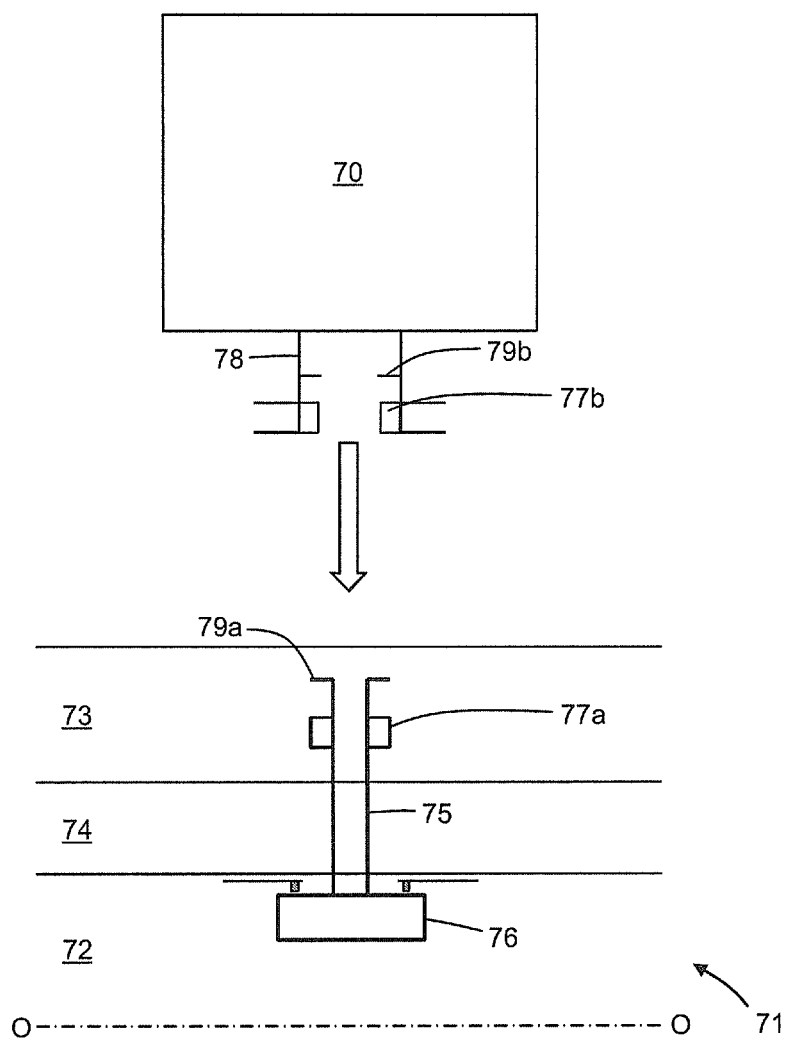
FIG. 3 shows schematically a mounting system for mounting a propeller blade to a rotor body.

FIG. 3 shows schematically more detail of a mounting system for mounting a propeller blade 70 to a rotor body 71. The system is suitable for use in engines of the type shown in FIGS. 1 and 2, but has wider applicability e.g. to engines with single propeller assemblies and also to puller style engines. The rotor body has a centre line O-O, and comprises a radially inner part 72 and a radially outer part 73 with a flow annulus 74 for hot exhaust gases from the engine therebetween. A pitch control rod 75 of a PCM extends across the flow annulus. The radially inner end of the rod terminates in an anchor 76, while the radially outer end of the rod terminates in a male coupling member 77a of a torque-transmitting formation. The blade has a neck 78 at its base, the neck carrying the female coupling member 77b of the torque-transmitting formation.

Each coupling member 77a, 77b has a respective set of splines. To mount the blade 70 to the rotor body 71, the sets of splines are inter-engaged. Torque can then be transmitted across the coupling members so that rotation of the anchor 76 and the pitch control rod 75 about the longitudinal axis of the rod leads to pitch variation of the blade. The PCM may have, for example, a bell crank that rotates the anchor. The bell cranks of the PCMs of all the propellers in a given propeller assembly can then be operated by a unison ring. Alternatively, the anchor may be a pitch ram cylinder or similar component.

The radially outer end of the pitch control rod 75 also carries a lugged structure 79a in which at least three, but preferably four or more equally spaced lugs are arranged around the circumference of the end of the rod. A corresponding lugged structure 79b is formed above the female coupling member 77b on the blade neck 78. To mount the blade 70 to the rotor body 71, the blade is held so that the spaces between the lugs of the lugged structure 79b match up with the lugs of the lugged structure 79a, and similarly the spaces between the lugs of the lugged structure 79a match up with the lugs of the lugged structure 79b. The two lugged structures can thus pass by each other when the blade is moved in the radial direction of the arrow of FIG. 3. The sets of splines of the coupling member 77a, 77b inter-engage as they also pass through each other. The blade continues to be moved until the sets of splines are beyond each other and out of engagement, and the blade can be rotated so that the lugs of the two lugged structures overlap. The blade is then moved in the reverse direction so that the sets of splines re-engage. The overlapping lugged structures, however, are not allowed to contact, but rather are held at a spacing of about 2-3 mm from each other.

The overlapping lugged structures 79a, 79b provide a back-up retention formation for the blade. The operation of the back-up retention formation is described in more detail below.

Figure 4:
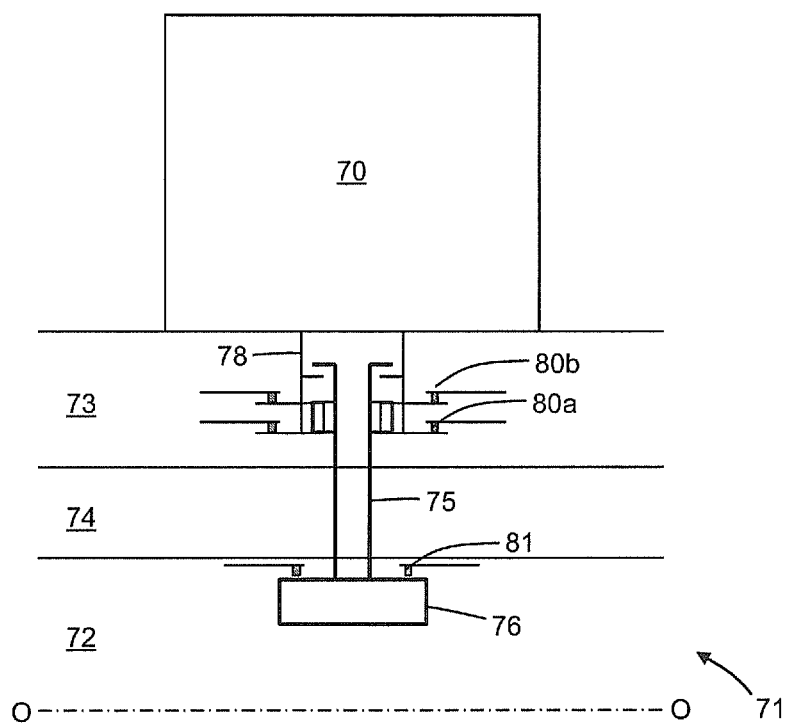
FIG. 4 shows schematically the mounting system of FIG. 3 in normal operation.

After the torque-transmitting formation and back-up retention formation are created, as described above, a primary bearing formation is formed in order to transmit blade centrifugal loads to the rotor body 71, as shown in FIG. 4. The primary bearing formation comprises inner 80a and outer 80b bearings which are located at suitable structures carried by the blade neck 78. For example, the inner bearing can be a ball bearing and the outer bearing can be a taper roller or a ball bearing. The bearings 80a, 80b transmit the blade centrifugal loads to a hub (not shown) of the outer part 73 of the rotor body.

PCM centrifugal loads are transmitted to the rotor body 71 by a secondary bearing formation 81 which is formed around the anchor 76. This bearing formation transmits the PCM centrifugal loads to another hub (not shown) of the inner part 72 of the rotor body, and can be, for example, a barrel roller bearing.

In normal operation, therefore, the centrifugal loads from the blade and the PCM are transmitted to the rotor body along different paths.

However, as the blades 70 are critical components, the back-up retention formation provides a back-up load path for the blade centrifugal loads in the event of partial or total failure of the primary bearing formation. Such failure can be, for example, in the inner 80a and outer 80b bearings or in the hub of the outer part 73 of the rotor body 71.

Figure 5:
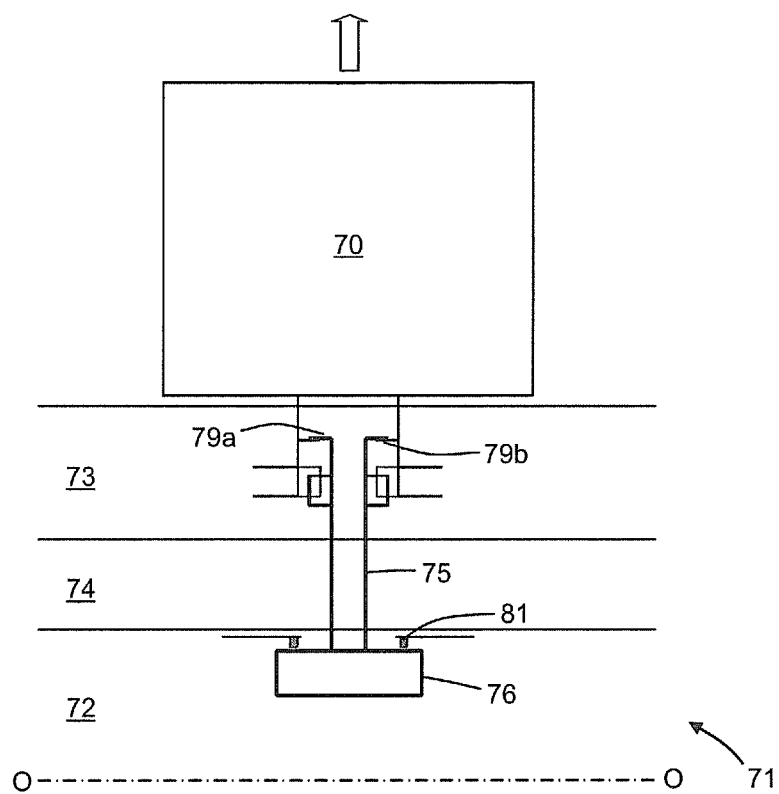
FIG. 5 shows schematically the mounting system of FIG. 3 after failure of a primary bearing formation.

More specifically, the primary and secondary bearing formations maintain the radial spacing between the anchor 76 and the blade 70. On failure of the primary bearing formation, as show in FIG. 5, the blade moves outwardly (indicated by the arrow) until the overlapping lugged structures 79a, 79b of the back-up retention formation engage each other, i.e. abutment surfaces provided by the lugs, which surfaces are normally spaced apart, contact each other so that blade centrifugal loads can divert across the interface formed between the abutment surfaces. The blade centrifugal load is then transmitted along the pitch rod 75, through the anchor 76 to the secondary bearing formation, and thence to the hub of the inner part 72 of the rotor body 71. The blade may not be able to pitch effectively due to the increased load through the secondary bearing formation. However, as long as the inner hub holds, the blade can be safely retained. Providing the inner hub with a wetted (i.e. oiled) failure case radial contact surface, may increase the ability of the blade to pitch even after bearing failure in the secondary bearing formation.

Thus, advantageously, the mounting system allows effective blade retention in the event of blade primary retention failure, the blade centrifugal loads being carried by an alternative path to the PCM anchor 76. The PCM can be adapted to perform back-up retention with relatively few alterations, and therefore does not increase significantly component costs or weight.

While the invention has been described in conjunction with the exemplary embodiments described above, many equivalent modifications and variations will be apparent to those skilled in the art when given this disclosure. For example, although the invention is described above in relation to an open rotor engine, it may also be adopted to mount blades of a turbofan or ducted fan engine. Also, the back-up retention formation may be formed by arrangements other than lugs, e.g. screw threads, pegs and hook slots etc. Accordingly, the exemplary embodiments of the invention set forth above are considered to be illustrative and not limiting. Various changes to the described embodiments may be made without departing from the spirit and scope of the invention.

The invention claimed is:

1. A mounting system for mounting a blade to a rotor body, the system having:
    a pitch control mechanism including an anchor and a pitch change rod extending radially outwardly from the anchor to join to a base of the blade, the anchor and the rod being rotatable about an longitudinal axis of the rod to vary the blade pitch, wherein the pitch control mechanism further includes a torque-transmitting formation between the blade and the anchor such that pitch-varying torque can be transmitted to the blade through the torque-transmitting formation while allowing relative radial movement between the blade and the anchor,
    a primary bearing formation which transmits blade centrifugal loads to the rotor body while accommodating variation of the blade pitch, and
    a secondary bearing formation which transmits pitch control mechanism centrifugal loads to the rotor body while accommodating rotation of the anchor and the rod during variation of the blade pitch;
    wherein:
    in normal operation, the radial spacing of the anchor and the blade is maintained by the primary and secondary bearing arrangements, and
    the mounting system further has a back-up retention formation which, on failure of the primary bearing formation leading to outward radial movement of the blade relative to the anchor, activates to divert blade centrifugal loads through the secondary bearing formation to the rotor body.

2. A mounting system according to claim 1, wherein the rotor body has a radially outer hub and a radially inner hub, the primary bearing formation transmitting blade centrifugal loads to the rotor body at the outer hub, and the secondary bearing formation transmitting pitch change mechanism centrifugal loads to the rotor body at the inner hub.

3. A mounting system according to claim 2, wherein the inner and outer hubs are separated by an annulus which, in use, carries engine exhaust gases.

4. A mounting system according to claim 1, wherein the torque-transmitting formation is located between a radially outer end of the pitch change rod and the base of the blade.

5. A mounting system according to claim 1, wherein the torque-transmitting formation is provided by male and female coupling members.

6. A mounting system according to claim 1, wherein the blade is separable from the rotor body at the torque-transmitting formation.

7. A mounting system according to claim 1, wherein the back-up retention formation allows up to 5 mm of outward radial movement of the blade relative to the anchor before engaging to divert blade centrifugal loads through the secondary bearing formation to the rotor body.

8. A mounting system according to claim 1, wherein the back-up retention formation is adjacent the torque-transmitting formation.

9. A mounting system according to claim 1, wherein the back-up retention formation is provided by abutment surfaces, which in normal operation are spaced apart, but engage together on outward radial movement of the blade relative to the anchor to divert blade centrifugal loads across an interface formed between the abutment surfaces.

10. A mounting system according to claim 1, wherein the pitch control mechanism further includes a crank for rotating the anchor, the crank being operable by a unison ring.

11. A propeller or fan assembly having:
    a rotor body, and
    a row of propeller or fan blades;
    wherein each blade is fastened to the rotor body by a respective mounting system according to claim 1.

12. An engine arrangement having:
    a power plant, and
    one or more propeller or fan assemblies according to claim 11 powered by the power plant.

* * * * *